(12) United States Patent
Ahagon et al.

(10) Patent No.: US 11,174,637 B2
(45) Date of Patent: Nov. 16, 2021

(54) PRESTRESSED CONCRETE FOR NON-PRIMARY STRUCTURAL MEMBERS

(71) Applicant: HPC Okinawa Co., LTD., Uruma (JP)

(72) Inventors: Masaki Ahagon, Okinawa (JP); Ken Iida, Numazu (JP); Yoneo Oshiro, Nanjiyo (JP); Hiromi Nishizono, Tokyo (JP); Yuuoh Mino, Urasoe (JP); Jin Hosoya, Tokyo (JP); Hirotaka Higashionna, Naha (JP); Nobuo Shimegi, Ichikawa (JP); Shunji Ariga, Naha (JP)

(73) Assignee: HPC OKINAWA CO., LTD., Uruma (JP)

( * ) Notice: Subject to any disclaimer, the term of this patent is extended or adjusted under 35 U.S.C. 154(b) by 0 days.

(21) Appl. No.: 15/314,611

(22) PCT Filed: Jun. 15, 2015

(86) PCT No.: PCT/JP2015/067134
§ 371 (c)(1),
(2) Date: Nov. 29, 2016

(87) PCT Pub. No.: WO2016/024438
PCT Pub. Date: Feb. 18, 2016

(65) Prior Publication Data
US 2017/0198478 A1     Jul. 13, 2017

(30) Foreign Application Priority Data

Aug. 11, 2014 (JP) .............................. JP2014-163397
Feb. 9, 2015 (JP) .............................. JP2015-022892

(51) Int. Cl.
*E04C 5/08* (2006.01)
*C04B 28/02* (2006.01)
(Continued)

(52) U.S. Cl.
CPC ............... *E04C 5/08* (2013.01); *C04B 14/02* (2013.01); *C04B 14/386* (2013.01); *C04B 14/48* (2013.01);
(Continued)

(58) Field of Classification Search
CPC . E04C 5/08; E04C 5/073; C04B 16/06; C04B 20/0072; C04B 20/0068;
(Continued)

(56) References Cited

U.S. PATENT DOCUMENTS 3,249,079 A * 5/1966 Moore ...................... B63B 5/10
114/266
3,455,074 A * 7/1969 Rice ........................ E04B 1/161
264/35
(Continued)

FOREIGN PATENT DOCUMENTS

DE      2736512 A1    2/1979
DE      4427661 A1    2/1995
(Continued)

OTHER PUBLICATIONS

Expansive Cement Building Materials in Civil Enginnering, 2011 (Year: 2011).*
(Continued)

*Primary Examiner* — Adriana Figueroa
(74) *Attorney, Agent, or Firm* — Kratz, Quintos & Hanson, LLP

(57) ABSTRACT

To provide a prestressed concrete which can be used for non-primary structural members such as general building members by using a chemical stress induced by an expansive material and a mechanical stress induced by a rust-resistant wire together and achieving reduction in weight and suppression of cracking. A prestressed concrete for non-primary structural members is characterized in that a
(Continued)

mechanical stress induced by a tensional material and a chemical stress induced by an expansive material for a concrete are introduced and that the tensional material is a rust-resistant continuous fiber reinforcing wire.

10 Claims, 11 Drawing Sheets

(51) Int. Cl.

| | | |
|---|---|---|
| E04C 2/06 | (2006.01) | |
| E04C 2/04 | (2006.01) | |
| E04C 3/26 | (2006.01) | |
| C04B 14/02 | (2006.01) | |
| C04B 16/06 | (2006.01) | |
| C04B 14/38 | (2006.01) | |
| C04B 14/48 | (2006.01) | |
| C04B 18/02 | (2006.01) | |
| C04B 18/08 | (2006.01) | |
| C04B 20/00 | (2006.01) | |
| E04C 5/07 | (2006.01) | |
| C04B 111/34 | (2006.01) | |
| C04B 111/40 | (2006.01) | |

(52) U.S. Cl.
CPC ............ *C04B 16/06* (2013.01); *C04B 18/027* (2013.01); *C04B 18/08* (2013.01); *C04B 20/0068* (2013.01); *C04B 20/0072* (2013.01); *C04B 28/02* (2013.01); *E04C 2/04* (2013.01); *E04C 2/06* (2013.01); *E04C 3/26* (2013.01); *E04C 5/073* (2013.01); *C04B 2111/34* (2013.01); *C04B 2111/40* (2013.01); *Y02W 30/91* (2015.05)

(58) Field of Classification Search
CPC ..... C04B 14/386; C04B 28/02; C04B 18/027; C04B 18/08; C04B 14/02; C04B 14/48; C04B 2111/40
USPC ................................ 52/223.6, 223.8, 223.14
See application file for complete search history.

(56) References Cited

U.S. PATENT DOCUMENTS

| | | | | |
|---|---|---|---|---|
| 4,494,352 A * | 1/1985 | Leemhuis | ................. | E04B 5/38 264/256 |
| 4,646,495 A * | 3/1987 | Chalik | .................... | E04B 1/04 52/236.3 |
| 5,670,208 A | 9/1997 | Chikiri | | |
| 7,651,966 B2 * | 1/2010 | Brow | ..................... | C03C 1/002 106/711 |
| 9,353,006 B2 * | 5/2016 | Lura | ..................... | C04B 28/02 |
| 2006/0070338 A1 * | 4/2006 | Pantelides | ................. | E04C 3/34 52/847 |
| 2007/0125273 A1 * | 6/2007 | Pinto | ..................... | C04B 28/04 106/638 |
| 2009/0305019 A1 * | 12/2009 | Chanvillard | .......... | C04B 22/008 428/220 |

FOREIGN PATENT DOCUMENTS

| | | |
|---|---|---|
| GB | 998777 A | 7/1965 |
| JP | S62-244951 A | 10/1987 |
| JP | H04-027183 B | 1/1992 |
| JP | H07-232944 A | 9/1995 |
| JP | 2002-326285 A1 | 11/2002 |
| JP | 2004-155623 A1 | 6/2004 |
| JP | 2005-162564 A1 | 6/2005 |
| JP | 2008-025178 A1 | 2/2008 |
| KR | 10-0150183 B1 | 3/1995 |
| KR | 10-2007-0003424 A | 1/2007 |
| TW | 199228 B | 2/1993 |
| TW | 259744 B | 10/1995 |

OTHER PUBLICATIONS

International Search Report for International Application No. PCT/JP2015/067134 dated Aug. 18, 2015.
Supplementary European Search Report for counterpart EPC Patent Application No. 15832227.1 dated Nov. 24, 2017 (8 Sheets).
Office Action of Taiwanese Patent Application No. 104120881 dated Oct. 4, 2018 (6 sheets).
Office Action of corresponding Chinese Patent Application No. CN 201580042638.4 dated Nov. 19, 2018 (7 pages, 8 pages translation, 15 pages total).
L. Han, et al.; "Beton Chinese Edition—Ready-mixed Concrete"; China Academic Journal Electronic Publishing House; 4th edition; Aug. 15, 2007; pp. 10-13 (4 pages, 1 page partial translation, 5 pages total)/ Cited in CN-OA dated Nov. 19, 2018 for Pat. App. No. 20158004263.8.
Y. Pan, et al.; "China Concrete and Cement Products"; China Academic Journal Electronic Publishing House; No. 4; Aug. 20, 2006; pp. 49-51 (3 pages, 1 page partial translation, 4 pages total)/ Cited in CN-OA dated Nov. 19, 2018 for Pat. App. No. 20158004263.8.

* cited by examiner

[Fig. 1 (A)]
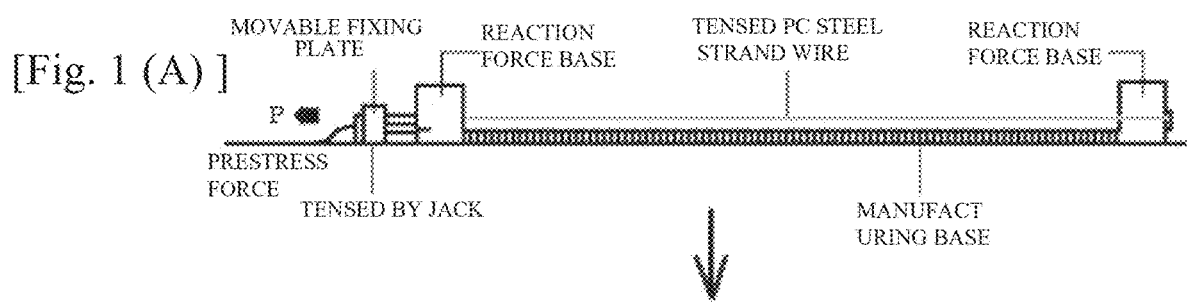
[Fig. 1 (B)]
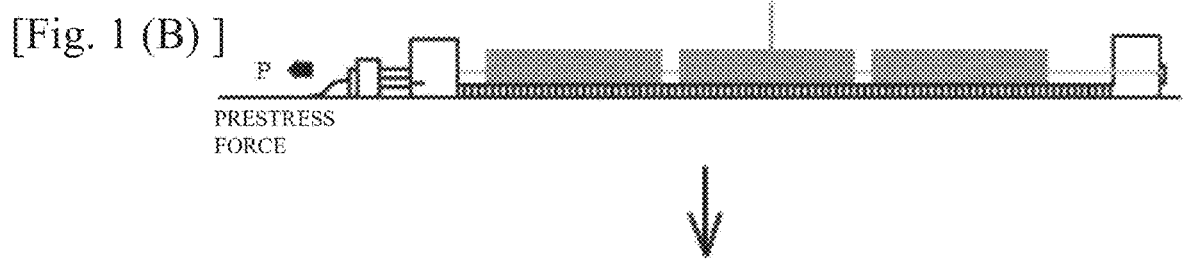
[Fig. 1 (C)]
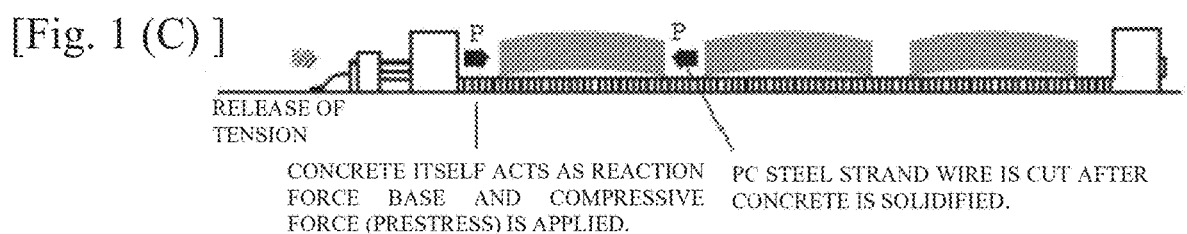

[Fig. 2]
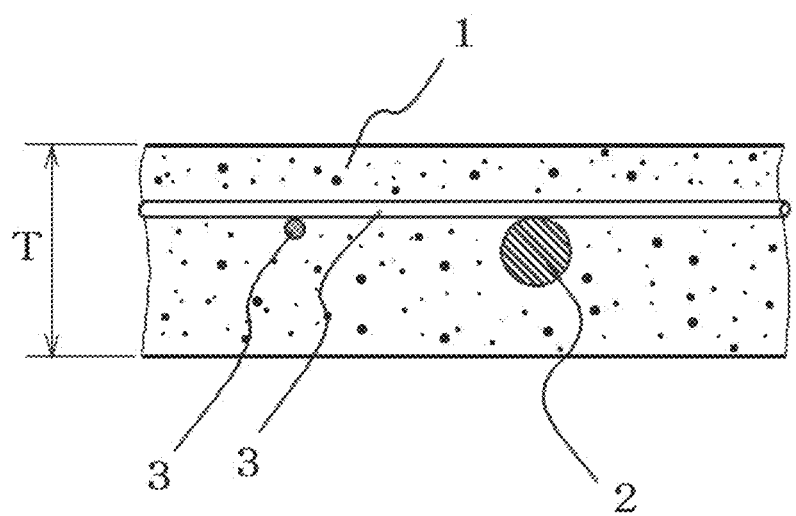

[Fig. 3 (1)]
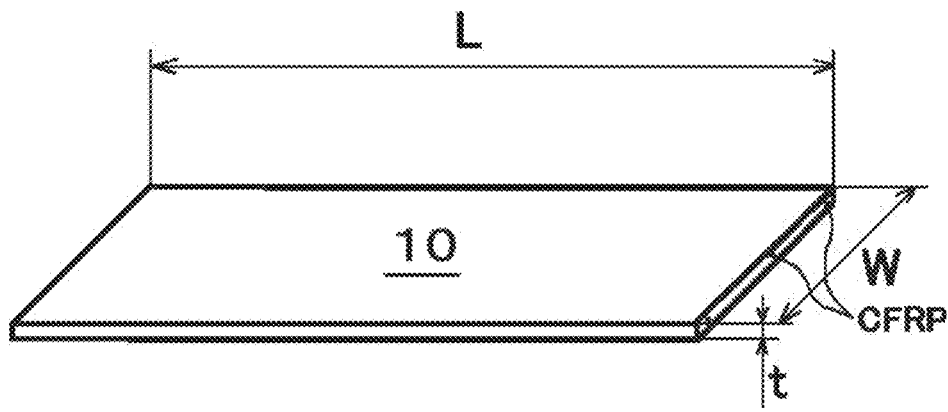
[Fig. 3 (2)]
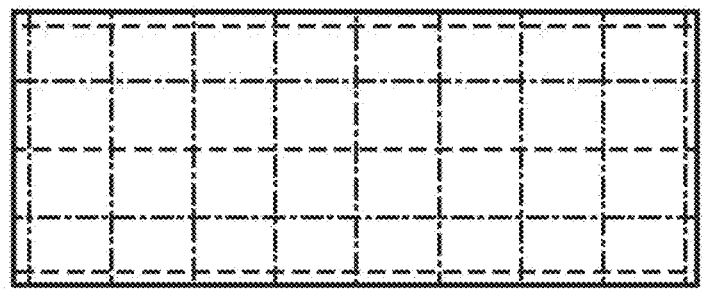
[Fig. 3 (3)]
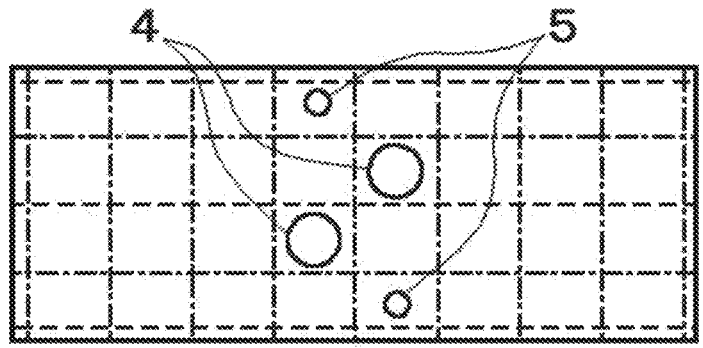
----- CFRP
------- SR

[Fig. 4]
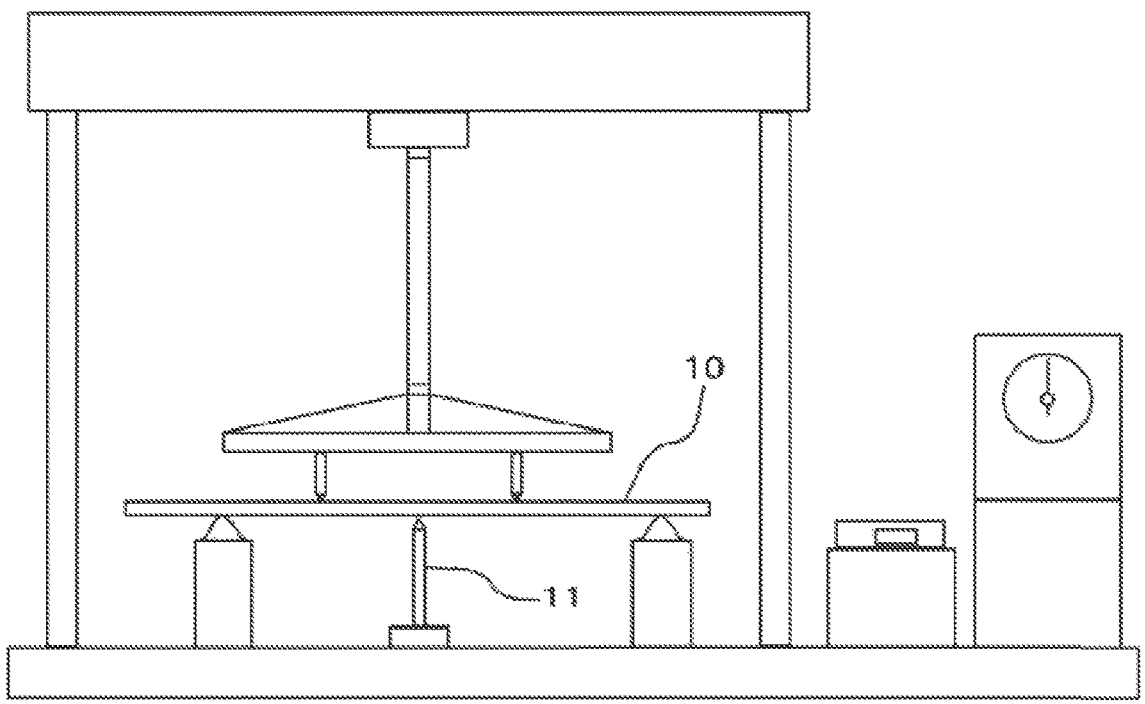
[Fig. 5]
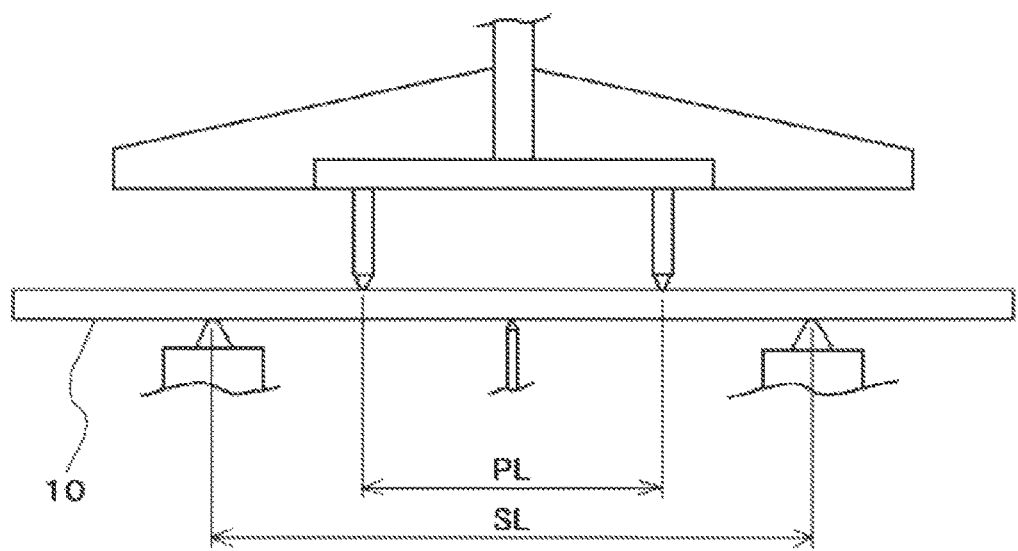

[Fig. 6]
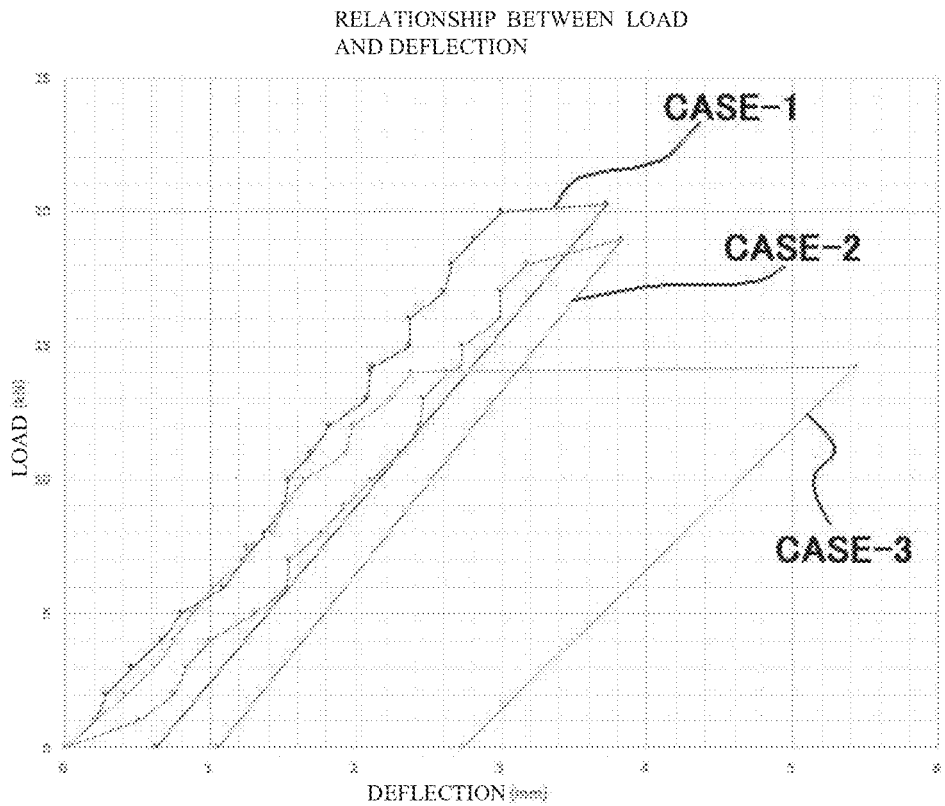
[Fig. 7]
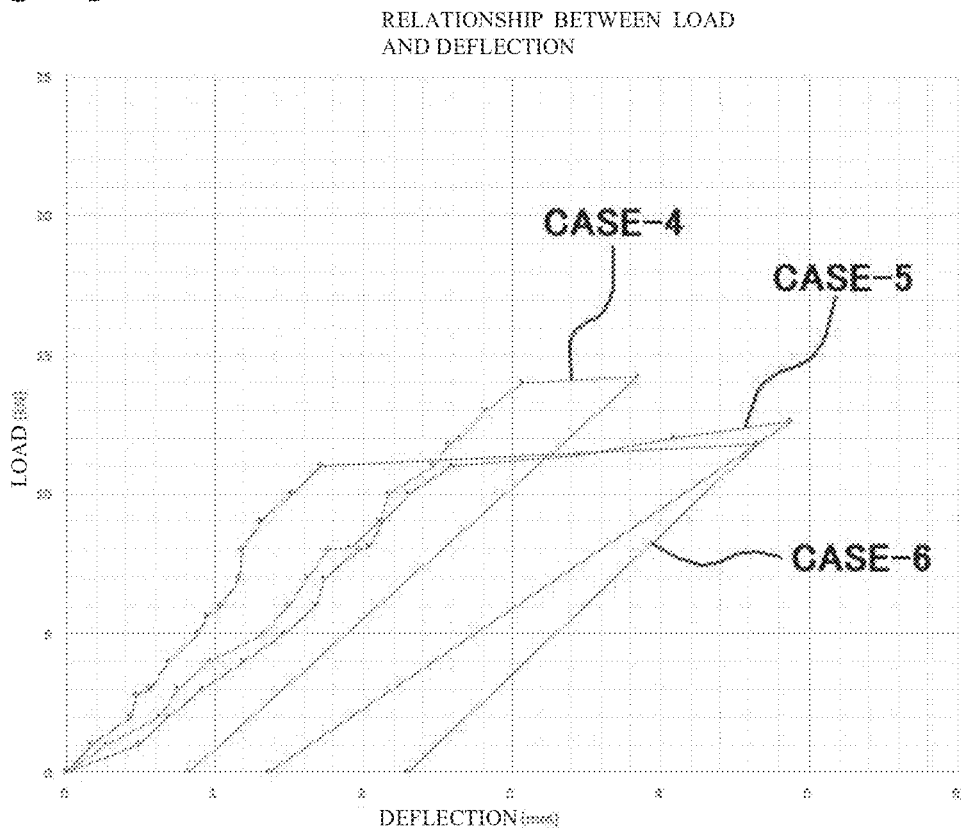

[Fig. 8-1]
【CASE-1】
AT THE TIME OF CRACKING
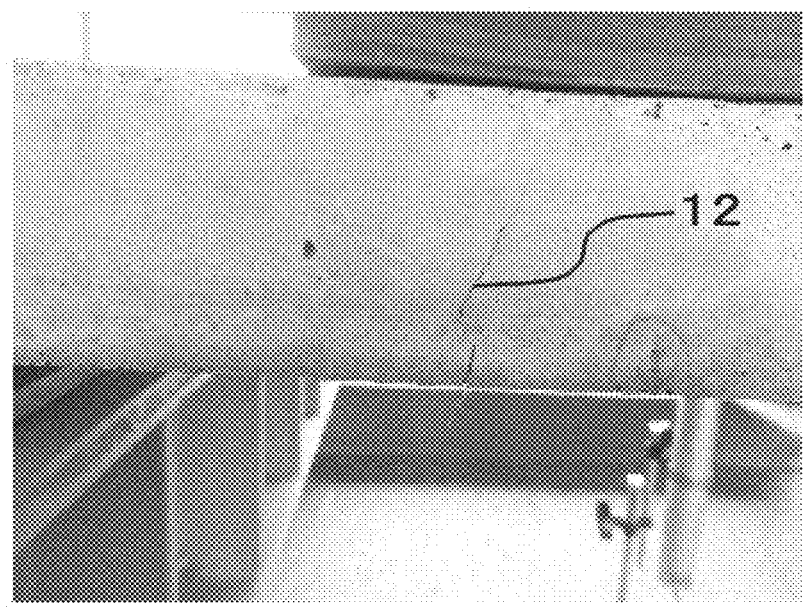
AT THE TIME OF UNLOADING
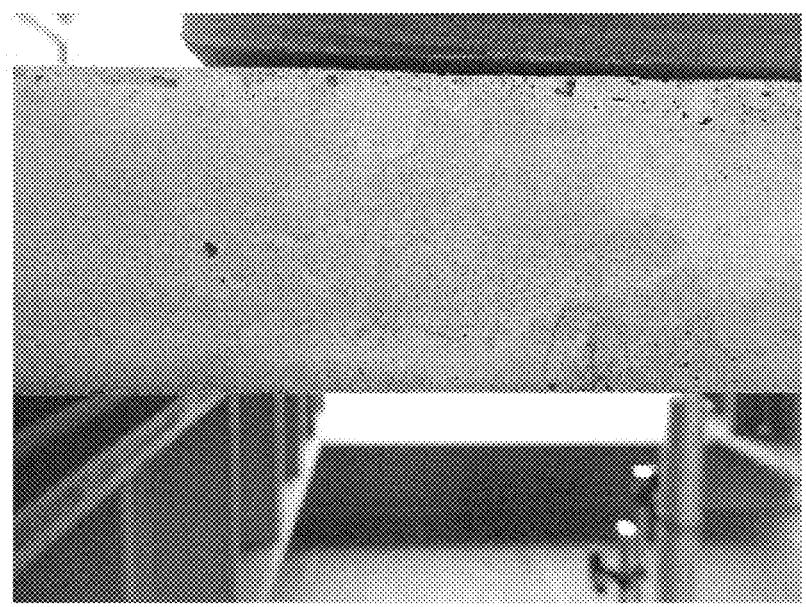

[Fig. 8-2]
【CASE-2】
AT THE TIME OF CRACKING
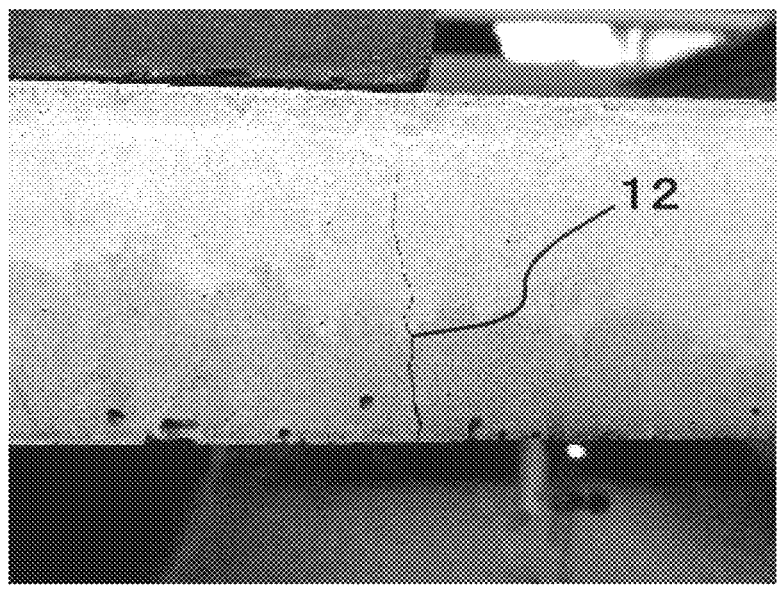
AT THE TIME OF UNLOADING
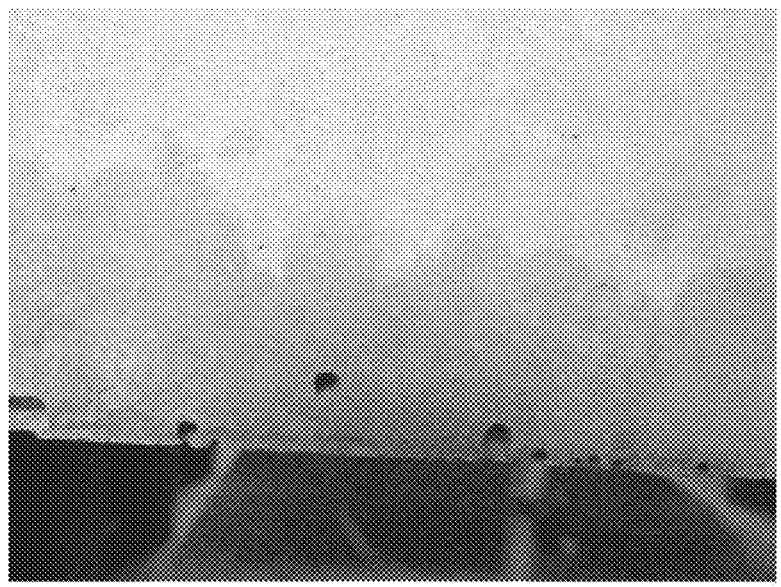

[Fig. 8-3]
【CASE-3】
AT THE TIME OF CRACKING
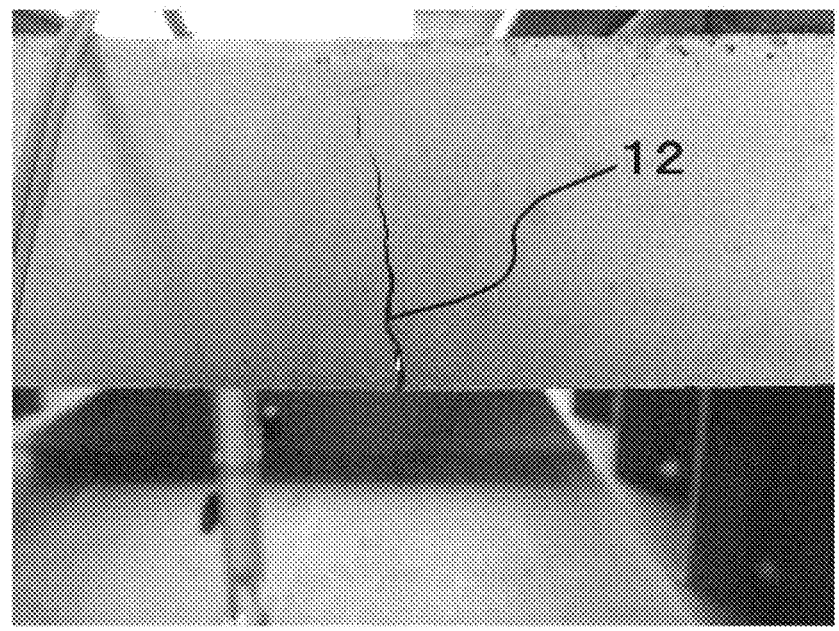
AT THE TIME OF UNLOADING
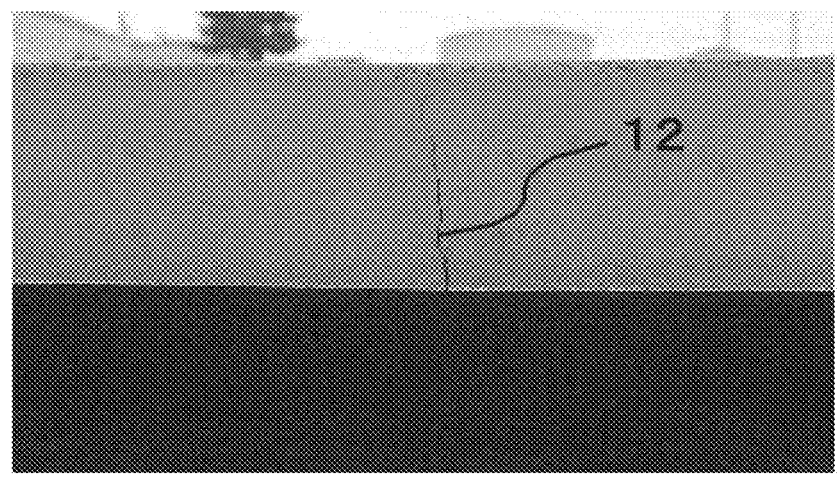

[Fig. 8-4]
【CASE-4】
AT THE TIME OF CRACKING
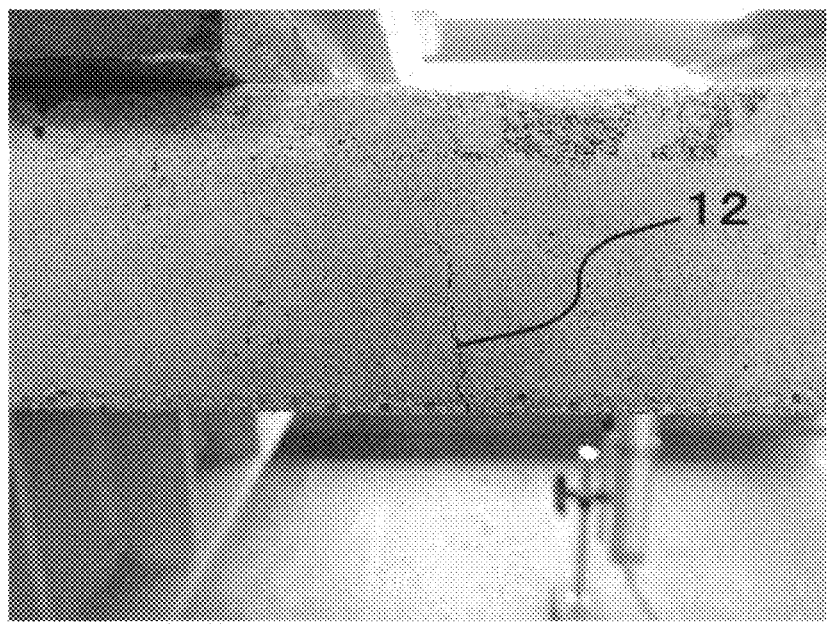
AT THE TIME OF UNLOADING
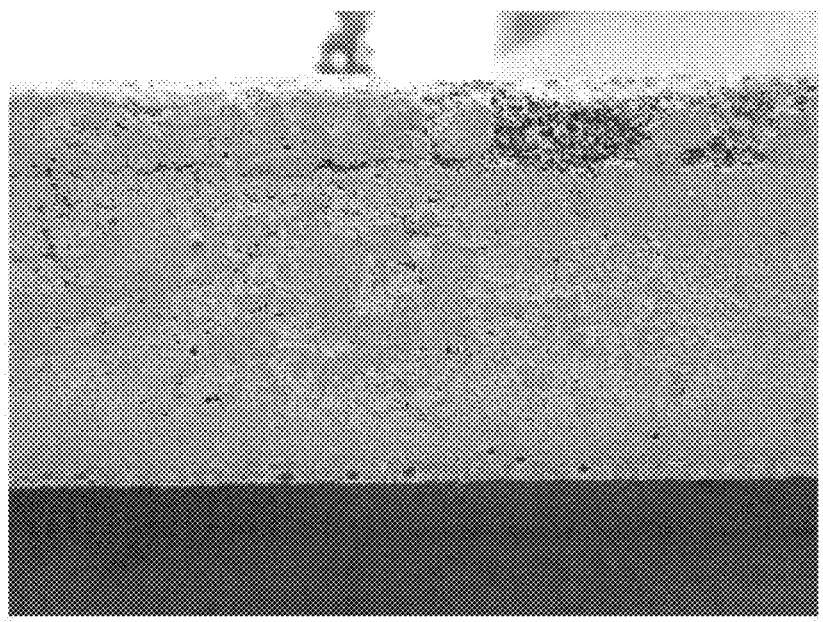

[Fig. 8-5]
【CASE－5】
AT THE TIME OF CRACKING
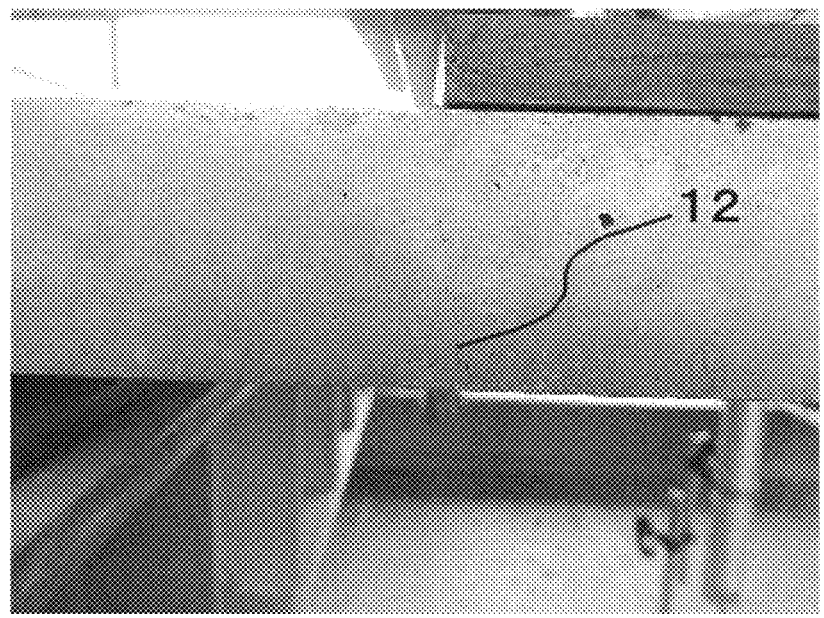
AT THE TIME OF UNLOADING
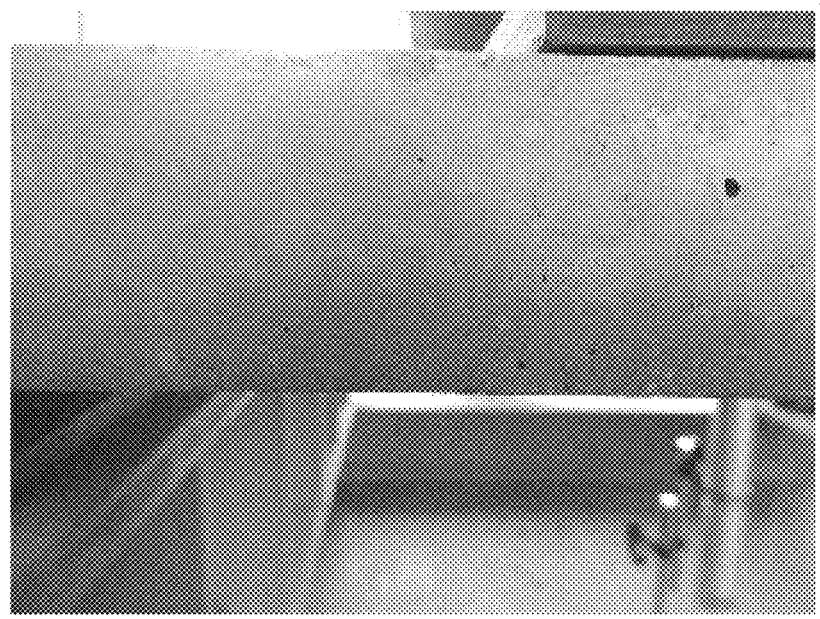

[Fig. 8-6]
【CASE-6】
AT THE TIME OF CRACKING
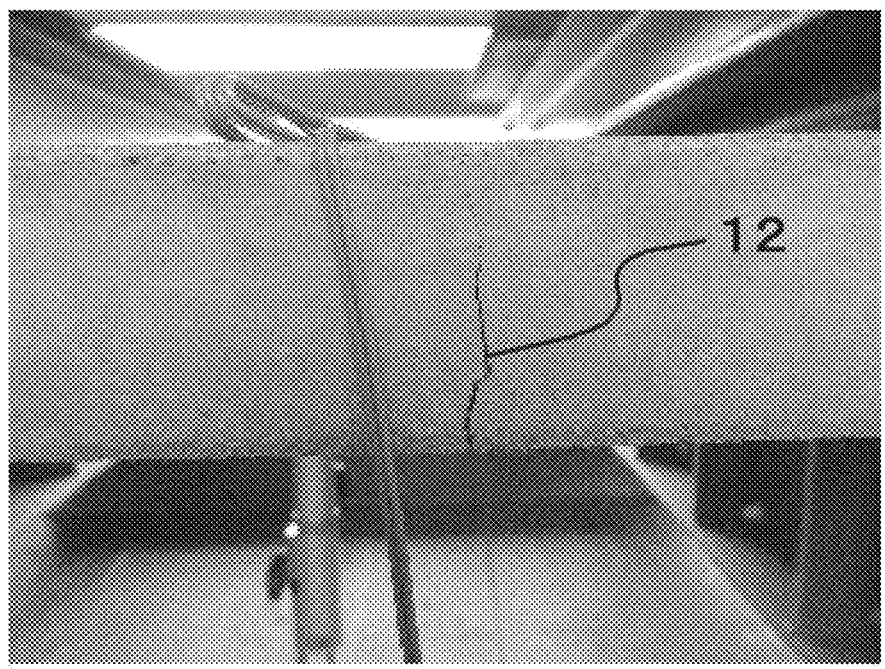
AT THE TIME OF UNLOADING
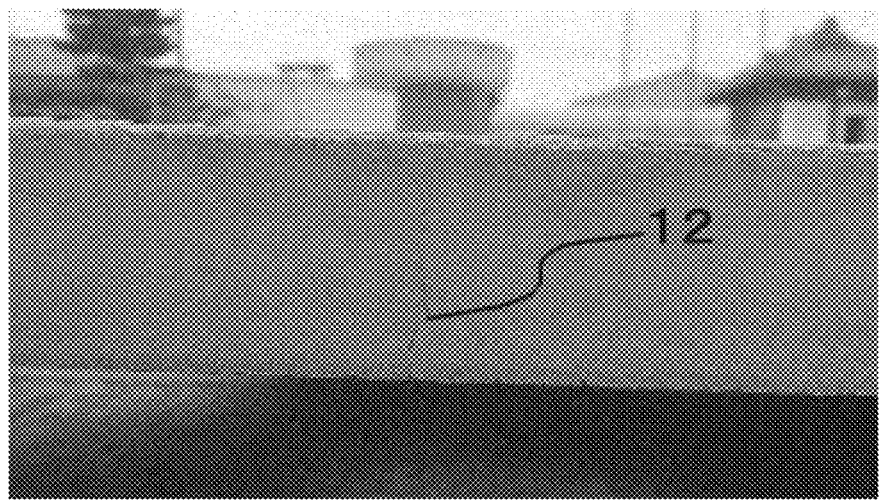

PRESTRESSED CONCRETE FOR NON-PRIMARY STRUCTURAL MEMBERS

TECHNICAL FIELD

The present invention relates to a prestressed concrete for non-primary structural members obtained by introducing a chemical stress induced by a concrete expansive material and a mechanical stress using a continuous fiber reinforcing wire.

BACKGROUND ART

Conventionally, a concrete obtained by introducing a prestress into a cement-based material having an excellent mechanical characteristic (compressive strength, flexural strength, or the like) has been developed.

In a conventional prestressed concrete, in a case of a pretension method, using a high-tensile steel material (PC steel material) as a tensional material to introduce a prestress, a concrete is poured while a PC steel wire or a PC steel strand wire obtained by twisting two or three wires is tensioned by a long line method or a form fixing method, and these PC steel wires are cut after curing and hardening to manufacture a prestressed concrete.

In recent years, a prestressed tensional material using a rod of a fiber material reinforced in one direction with a glass fiber, a carbon fiber, an aramid fiber, or the like having a high strength has been used, and has attracted attention as a prestressed concrete having excellent corrosion resistance.

JP 2004-155623 A discloses a technique for expressing high tensile strength of a prestressed concrete or high shear strength thereof.

JP 2002-326285 A discloses a technique for a prestressed concrete tensional material using a continuous fiber reinforced plastic composite material.

Usually, a concrete structure starts to be dried from a surface thereof. Therefore, when a shrinkage stress thereof is higher than a tensile strength of the concrete, a crack is generated.

In order to reduce the cracks, it is necessary to make the expansion amount sufficient to compensate the drying shrinkage amount of a concrete or to reduce the drying shrinkage amount by blending a predetermined concrete admixture to the concrete. As a concrete admixture therefor, an expansive material or a shrinkage reducing agent is known.

Among these materials, the expansive material contains a material expanding in accordance with a hydration reaction, and prevents drying shrinkage of a concrete structure due to hydration expansion.

JP 2005-162564 A discloses an expansive material of a concrete. This makes inexpensive quick lime sufficiently usable as an expansive material for a mortar or a concrete, for example, without subjecting quick lime to a complicated treatment such as a treatment for manufacturing a clinker burning material by adding another raw material component like in prior art, and almost without causing an increase in cost. This provides an expansive material capable of granting such a stable expansion force to be able to compete with contraction of a mortar or a concrete or an external pressure sufficiently, in particular, an expansive material capable of introducing a chemical prestress without using a large amount of the expansive material, and a concrete capable of introducing a chemical prestress.

As described above, a prestressed concrete has been developed in order to overcome the largest problem of a concrete that the concrete is resistant to compression but is not resistant to tension. The prestressed concrete makes a compressive force applied (prestressed) to a concrete member before a load is applied, prevents generation of a tensile stress in the concrete when the concrete receives the load, or controls the tensile stress. The prestressed concrete can prevent cracking due to a tensile stress compared to a reinforced concrete.

CITATION LIST

Patent Literature

Patent Literature 1: JP 2004-155623 A
Patent Literature 2: JP 2002-326285 A
Patent Literature 3: JP 2005-162564 A

SUMMARY OF INVENTION

Technical Problem

As described in the above conventional patent publications, a prestressed concrete has been developed variously in order to increase strength thereof.

As an application, a conventional prestressed concrete is often used for a bridge, an electric pole, a concrete pile, a construction member, a beam of a building, or the like, and is mainly used for a structural material.

An example of a tensile load of a tensional material in an actual mechanical stress will be described.

P.S. Mitsubishi Construction Co., Ltd.: new plant construction company newspaper: construction of a plant with a large-scale planar shape by a PCaPC method general PC steel bar: diameter 36 mm: 6 m column: tension: 550 kN DW cable: 10 m to 14 m girder: tension 1,243 to 2,264 kN JP 2004-155623 A describes a mechanical prestress of a prestressed concrete. JP 2004-155623 A describes that tensile strength is 861 MPa immediately after a prestress is introduced while a steel rod having a diameter of 26 mm is disposed in the center of a concrete having a length of 400 mm and a thickness of 100 mm, although the concrete is a test body.

At the diameter of 26 mm, a tensile load is 457 kN.

As described above, a conventional mechanical stress is for a large structure (for example, a bridge or a beam), and is for suppressing cracking due to a bending stress. A tensile load as a mechanical stresses is several hundreds to several thousands kN. A prestress amount thereof is the above 861 MPa or more. Even when a prestress amount due to a chemical stress at several MPa is introduced simultaneously, there is almost no influence. Therefore, in an actual site, the chemical stress is not introduced simultaneously.

A prestressed concrete is an effective technique capable of suppressing cracking on a surface, which may be a fate of a concrete.

However, as described above, the prestressed concrete is used for structural materials, but is hardly used for non-structural materials such as general construction members.

This is because a conventional image for a concrete, such as a large weight, difficulty in reducing a concrete thickness, or cracking, is a major obstacle in applying the concrete to a non-structural material as a general construction member requiring a light weight, providing a cutout portion or an opening, and a design property.

However, the applicants have confirmed through a test or the like that a prestressed concrete for non-primary structural members having a plate thickness of 50 mm or less and obtained by introducing a mechanical stress in which a tensile load of a tensional material is 150 kN or less and a chemical stress simultaneously as in the present invention is largely influenced by a synergistic effect, and have completed the present invention.

The present invention has been achieved in view of the above problems. An object thereof is to provide a prestressed concrete which can be used for non-primary structural members such as general building members by using a chemical stress induced by an expansive material and a mechanical stress induced by a continuous fiber reinforcing wire together, achieving reduction in weight, reduction in thickness, and suppression of cracking, and increasing the degree of freedom in design.

Solution to Problem

In order to solve various problems, a first embodiment of the present invention provides a prestressed concrete for non-primary structural members, obtained by introducing a prestress into a concrete for non-primary structural members, in which a mechanical stress induced by a tensional material and a chemical stress induced by an expansive material for a concrete are introduced and the tensional material is a rust-resistant wire.

The mechanical stress induced by a tensional material may be any stress as long as a tension wire can introduce a mechanical tensile stress into a concrete in advance. A prestress may be introduced by a pretension method or a posttension method.

The rust-resistant wire may be any wire as long as having no risk of rupture of a concrete by expansion due to rust of a tensional material after the concrete is poured. Examples thereof include a rust-resistant metal such as stainless steel, an aluminum alloy, a titanium alloy, a nickel alloy, a chromium alloy, a molybdenum alloy, or a tungsten alloy, and a non-metal material such as a resin material or a vegetable fiber material.

For the chemical stress induced by an expansive material for a concrete, any expansive material used for a concrete may be mixed, and an admixture capable of introducing a chemical stress into a concrete or the like may be mixed.

The concrete for non-primary structural members is not a concrete member used for a structural portion requiring high strength such as a bridge, an electric pole, a concrete pile, a construction member, or a beam of a building, but a construction member used for members other than primary structural members such as general building members, a flooring material, a ceiling material, a wall material, a finishing member, a design member, a furniture material, a partition wall member, a cosmetic member, a fitting member, a mounting member, or the like. In addition, for example, the concrete for non-primary structural members can be used as an alternate member for a metal member, a glass member, a hard resin member, a wood member, an impact energy absorbing member such as a damping member or a vibration isolation member, or the like. The shape of the concrete is not limited. Examples of thereof include a plate shape, a character object shape, a hollow shape, and a three-dimensional shape.

A second embodiment provides the prestressed concrete for non-primary structural members described in the first embodiment, characterized in that the tensional material is a continuous fiber reinforcing wire.

The continuous fiber reinforcing wire is a linear continuous fiber reinforcing material, and is a PC tensional material using a reinforced fiber reinforcing material continuously molded in a linear shape. The continuous fiber reinforcing material is a generic name of a material obtained by binding a carbon fiber, a glass fiber, an aramid fiber, a vinylon fiber, or the like with an epoxy resin or the like.

The reinforced fiber reinforcing material has better physical properties (tensile strength, elastic modulus) such as light weight, high strength, high elasticity, corrosion resistance, a non-conductive property, or a non-magnetic property than reinforcement, and excellent corrosion resistance and electromagnetic characteristics which reinforcement does not have.

The linear shape generally means a linear shape or a two-dimensionally or three-dimensionally assembled shape from a shape unit thereof, such as a round shape, a rectangular shape, an irregular-shaped (rib or indented surface) rod, a braid-shaped rod, a twisted wire-shaped strand, or a lattice shape.

A third embodiment provides a prestressed concrete for non-primary structural members, characterized in that the continuous fiber reinforcing wire is a reinforcing fiber wire of one or more kinds of fibers selected from an aramid fiber, a carbon fiber, a glass fiber, and a poly-p-phenylenebenzobisoxazole fiber.

A fourth embodiment provides a prestressed concrete for non-primary structural members, characterized in that the expansive material for a concrete is a mixture of one or more kinds selected from a lime-based expansive material such as quick lime, an ettringite-based expansive material such as calcium sulfoaluminate, an ettringite-lime composite-based expansive material, an iron powder-based expansive material, a magnesium-based expansive material, an aluminum powder-based expansive material, a shale-based expansive material, and a silica-based expansive material.

The chemical stress only needs to act on a surface of a concrete. Any chemical stress can be used as long as having effects for reducing a weight and suppressing cracking. A combination thereof is not limited.

A fifth embodiment provides a prestressed concrete for non-primary structural members, characterized in that a wire of the tensional material has a wire diameter of 15.0 mm or less.

The wire diameter may be any value as long as being 15.0 mm or less. The wire diameter only needs to be able to secure tensile strength capable of introducing a mechanical prestress.

The wire diameter is preferably from 5.0 mm to 13.5 mm, and more preferably from 5.0 mm to 10.0 mm.

A wire diameter of 15.0 mm or more makes a covering thickness of a concrete larger, makes it difficult to reduce a weight, and limits the degree of freedom in design. Therefore, the wire diameter of 15.0 mm or more is not preferable from a viewpoint of a design property.

A sixth embodiment provides a prestressed concrete for non-primary structural members, characterized in that one wire of the tensional material has a tensile load of 150 kN or less.

The tensile load may be any value as long as being 150 kN or less. The tensile load only needs to be able to secure a tensile load capable of suppressing cracking on a surface of a concrete effectively after a prestress is introduced.

The tensile load is preferably from 5 kN to 120 kN, more preferably from 10 kN to 80 kN, and still more preferably about from 15 kN to 50 kN.

The tensile load can be adjusted arbitrarily according to a plate thickness of a prestressed concrete. When the thickness of a prestressed concrete is 40 mm or less, the tensile load may be 50 kN or less.

A seventh embodiment provides a prestressed concrete for non-primary structural members, characterized by having a concrete thickness of 50 mm or less.

The concrete thickness may be any value as long as being 50 mm or less. The concrete thickness only needs to be able to secure a minimum covering thickness due to using a continuous fiber reinforcing wire as a tensional material.

The concrete thickness is preferably 45 mm or less, and more preferably 40 mm or less. In a continuous fiber reinforcing material, explosion does not occur due to rust or the like because of rust resistance, and therefore the covering thickness can be 10 mm or less.

An eighth embodiment provides a prestressed concrete for non-primary structural members, characterized in that a mesh sheet formed of a fiber reinforced resin is used.

A mesh sheet formed of a fiber reinforced resin is embedded in a surface of the prestressed concrete, an inside thereof, or both thereof. Examples of the fiber reinforced resin include a carbon fiber reinforced resin, a glass fiber reinforced resin, an aramid fiber reinforced resin, a boron fiber reinforced resin, a polyethylene fiber reinforced resin, and a Zylon reinforced resin.

A gap between meshes in the mesh sheet may be any value, but is preferably about from 10 mm to 200 mm, and more preferably about from 10 mm to 100 mm, which are effective for suppressing cracking on a surface. A plurality of the mesh sheets may be provided. A prestress may be introduced.

A ninth embodiment provides a prestressed concrete for non-primary structural members, characterized in that a ceramic insert is embedded in a mesh portion of the mesh sheet.

The insert is an embedding tool embedded in a concrete product and used for a hanging scaffold, a form stopper, or the like, and is a ceramic insert having excellent corrosion resistance. The ceramic insert is embedded so as to be fitted in the mesh portion of the mesh sheet.

A tenth embodiment provides a prestressed concrete for non-primary structural members, characterized in that a rust-resistant metal insert is embedded in the mesh portion of the mesh sheet.

The insert may be any insert as long as being made of a rust-resistant metal. Examples thereof include titanium, phosphor bronze, molybdenum, aluminum, an alloy RENY, an alloy VESPEL, an alloy PEEK, and an alloy PVDF.

An eleventh embodiment provides a prestressed concrete for non-primary structural members, characterized in that a hard resin insert is embedded in the mesh portion of the mesh sheet.

The insert may be any insert as long as being made of a hard resin. Examples thereof include hard vinyl chloride, polycarbonate, acrylic, polypropylene, bakelite phenol, melamine, and polyester. A fiber reinforced resin or the like may be used.

A twelfth embodiment provides a prestressed concrete for non-primary structural members, characterized in that a porous artificial lightweight material is used.

The porous artificial lightweight material is used in a part of an aggregate in order to reduce a weight and to improve heat insulation, processability, and workability. Examples of the porous artificial lightweight aggregate include an inorganic porous artificial lightweight aggregate (fly ash, obsidian, perlite, pearlstone, pitchstone, or shale), a glass-based porous artificial lightweight aggregate, and a china clay fire-based porous artificial lightweight aggregate.

A thirteenth embodiment provides a prestressed concrete for non-primary structural members, characterized in that a discontinuous fiber reinforcing material is used.

The discontinuous fiber reinforcing material may be any material as long as being a fiber reinforcing material in a discontinuous state.

As a size of a fiber, a diameter of 0.005 to 1.0 mm and a length of 2 to 30 mm are preferable, and a diameter of 0.01 to 0.5 mm and a length of 5 to 25 mm are more preferable from viewpoints of preventing material separation of the fibers in a formulation and improving bending strength or toughness after hardening. An aspect ratio of a carbon fiber (fiber length/fiber diameter) is preferably from 20 to 200, and more preferably from 30 to 150.

The blending amount thereof is properly from 0.5 to 10.0%, preferably from 1.0 to 9.0%, and more preferably from 1.0 to 5.0% in terms of volume percent in a formulation. The blending amount of less than 0.5% reduces flexural strength of a structural member or toughness thereof, and therefore is not preferable. On the other hand, the blending amount of more than 10.0% increases a unit amount of water in order to ensure flowability or the like, does not enhance an effect for reinforcing a fiber even by increasing the blending amount, and therefore is not economical. In addition, the blending amount of more than 10.0% easily generates a so-called fiber ball in a kneaded product, and therefore is not preferable.

A fourteenth embodiment provides a prestressed concrete for non-primary structural members, characterized in that the discontinuous fiber reinforcing material is a reinforcing fiber material formed of one or more kinds of fibers selected from a carbon fiber, a glass fiber, and a resin fiber.

A fifteenth embodiment provides a prestressed concrete for non-primary structural members, characterized in that a pigment is mixed.

The pigment may be any pigment as long as being blended in a concrete raw material and coloring a concrete.

The pigment can be appropriately selected from conventional pigments according to a desired color, and can be blended. Specific examples thereof include a powdery inorganic pigment such as red iron oxide, titanium white, chrome yellow, ultramarine blue, cobalt blue, or cobalt purple.

Examples thereof further include titanium dioxide, zinc sulfide, zinc oxide, iron oxide, magnetite, magnesium iron oxide, chromium oxide, ultramarine blue, cobalt oxide, nickel or chromium-antimony-titanium oxide, manganese-titanium-rutile, cobalt oxide, a mixed oxide of cobalt and aluminum, a rutile mixed-phase pigment, sulfide of rare earth, Spinner of cobalt, nickel, and zinc, Spinner of copper, zinc, and manganese based on iron and chromium, a bismuth-vanadium salt, and a blend pigment. Particularly, examples of a color index pigment include pigment yellow 184, pigment yellow 53, pigment yellow 42, pigment yellow brown 24, pigment red 101, pigment blue 28, pigment blue 36, pigment green 50, pigment green 17, pigment black 11, pigment black 33, and pigment white 6. A mixture of these inorganic pigments may be used.

Examples of an organic pigment include a monoazo pigment, a disazo pigment, a laked azo pigment, a R-naphthol pigment, a naphthol AS pigment, a benzimidazolone pigment, a disazo condensation pigment, an azo metal complex pigment, a polycyclic pigment such as a phthalocyanine pigment, a quinacridone pigment, a perylene pigment, a perinone pigment, a thioindigo pigment, an anthanthrone pigment, an anthraquinone pigment, a flavanthrone pigment, an indathrone pigment, an isobioranthrone pigment, a pyranthrone pigment, a dioxazine pigment, a quinophthalone pigment, an isoindolinone pigment, an isoindoline pigment, or a diketopyrrolopyrrole pigment, and carbon black. A mixture of these organic pigments may be used. These organic pigments and inorganic pigments may be used in combination of two or more kinds thereof.

A pigment is powdery, and the addition amount thereof is small. Therefore, even when the pigment is added directly to a concrete kneaded product and is stirred, the pigment is not dispersed uniformly in many cases.

Therefore, a pigment is preferably prepared in a form of slurry using a water reducing agent and water.

The water reducing agent is used in order to prevent aggregation of a pigment in water, to improve dispersion thereof, and to make dispersion of the pigment in a concrete kneaded product easier.

The absolute amount of the water reducing agent contained in the slurry is small. Therefore, the water reducing agent hardly influences a characteristic such as strength of a colored concrete.

Examples of the water reducing agent used for slurry include a lignin-based, naphthalene sulfonic acid-based, melamine-based, and polycarboxylic acid-based water reducing agent for a cement, an AE water reducing agent, a high-performance water reducing agent, and a high-performance AE water reducing agent, which are general water reducing agents. It is only necessary to use a water reducing agent selected from these examples, and two or more kinds thereof can be used together.

As the water reducing agent used for slurry, the same agent as that blended in the concrete kneaded product is preferably used because of being stirred with the concrete kneaded product rapidly.

Viscosity of slurry is determined appropriately considering pigment fineness, the kind and amount of the water reducing agent, the amount of water, and the like.

A sixteenth embodiment provides a prestressed concrete for non-primary structural members, characterized in that any irregularities are formed on a surface thereof using a soft form.

The soft form may be any form as long as being a soft form using a soft material such as a resin or a rubber and capable of forming any irregularities on a surface of a concrete.

Examples of a resin which is a soft material include a thermoplastic resin and a thermosetting resin. Examples of the thermoplastic resin include polypropylene, polycarbonate, PET, and PBT obtained by kneading a short fiber. Examples of the thermosetting resin include an epoxy resin, a vinyl ester resin, an unsaturated polyester resin, and a resin obtained by combining these resins appropriately.

Examples of a fiber reinforced material include a glass fiber, a carbon fiber, and an aramid fiber, usually used for a fiber reinforced plastic.

A foamed resin form formed of a foamed body of a resin such as polyethylene, polypropylene, polystyrene, or polyurethan may be used.

Examples of a rubber which is a soft material include a natural rubber and a synthetic rubber. Examples of the synthetic rubber include a silicone rubber, a urethane rubber, a fluorocarbon rubber, an isoprene rubber, an ethylene propylene rubber, a styrene butadiene rubber, and a chloroprene rubber.

The soft form may be any form as long as being a plate-shaped elastic form in which any irregularities have been formed such that irregularities appear on a surface of a concrete after the soft form is peeled. Examples thereof include a form obtained by solidifying and molding a resin material or a rubber material such that any shape appears on a surface, a form obtained by subjecting a surface of a plate body of a resin material or a rubber material to laser processing, and a form obtained by molding a resin material or a rubber material using a 3D printer.

Any irregular shape may be any shape as long as being designed so as to enhance a design property. Examples thereof include a cast stone pattern, a grain pattern, a geometric pattern, a perforated panel, and an expression of a shape such as a letter, a photograph, or a character authorized by copyright.

Advantageous Effects of Invention

The present invention exhibits the following effects.

1) By introducing a mechanical stress induced by a rust-resistant wire and a chemical stress induced by an expansive material for a concrete, it is possible to achieve a prestressed concrete capable of achieving reduction in weight and suppression of cracking and capable of being used for non-primary structural members.

2) By using a rust-resistant continuous fiber reinforcing wire, a problem of explosion due to rust can be solved, a covering thickness can be minimized, a concrete thickness can be reduced, and applications of a concrete as a general building material can be widened largely.

3) By using a concrete expansive material together, a portion hardly influenced by a mechanical prestress can be compensated by a chemical stress.

4) A concrete thickness can be reduced, an opening can be provided, and the degree of freedom in design is widened largely.

5) Due to a synergistic effect of a mechanical stress and a chemical stress, strength can be increased even when a shape of a surface changes or cut out shape or an opening is provided. Therefore, a drastic design configuration can be made, and a more flexible prestressed concrete plate can be achieved.

6) By reducing a thickness and a weight and suppressing cracking, application to a member for which a conventional concrete has not been used is possible.

7) A prestressed concrete can be used as an alternate member for a metal member, a glass member, a hard resin member, a wood member, an impact energy absorbing member such as a damping member or a vibration isolation member, a form material as a preceding framework, or the like.

8) A prestressed concrete having any color can be provided.

9) A prestressed concrete having any irregular shape expressed on a surface thereof and having a higher design property can be achieved.

BRIEF DESCRIPTION OF DRAWINGS

FIGS. 1(A) to 1(C) are explanatory views of a conventional pretension bed (manufacturing apparatus).

FIG. 2 is a schematic view illustrating arrangement of a tensional material in a prestress concrete according to the present invention.

FIGS. 3(1) to 3(3) are schematic views of a bending test body in the prestress concrete according to the present invention.

FIG. 4 is a schematic diagram illustrating a bending test situation of the prestress concrete test body according to the present invention.

FIG. 5 is a diagram illustrating a load position of the prestress concrete test body according to the present invention.

FIG. 6 is a diagram illustrating a bending test result of three prestress concrete test bodies with holes according to the present invention.

FIG. 7 is a diagram illustrating a bending test result of three prestress concrete test bodies without holes according to the present invention.

FIG. 8-1 is a diagram illustrating situations in CASE-1 at the time of cracking and at the time of unloading in a bending test of the prestress concrete test body according to the present invention.

FIG. 8-2 is a diagram illustrating situations in CASE-2 at the time of cracking and at the time of unloading in a bending test of the prestress concrete test body according to the present invention.

FIG. 8-3 is a diagram illustrating situations in CASE-3 at the time of cracking and at the time of unloading in a bending test of the prestress concrete test body according to the present invention.

FIG. 8-4 is a diagram illustrating situations in CASE-4 at the time of cracking and at the time of unloading in a bending test of the prestress concrete test body according to the present invention.

FIG. 8-5 is a diagram illustrating situations in CASE-5 at the time of cracking and at the time of unloading in a bending test of the prestress concrete test body according to the present invention.

FIG. 8-6 is a diagram illustrating situations in CASE-6 at the time of cracking and at the time of unloading in a bending test of the prestress concrete test body according to the present invention.

DESCRIPTION OF EMBODIMENTS

Embodiments of the present invention will be described with reference to the drawings.

First, FIGS. 1(A) to 1(C) illustrate a method for introducing a mechanical prestress by a conventional pretension method.

FIGS. 1(A) to 1(C) are explanatory views of a pretension bed (manufacturing apparatus).

These illustrate an example in which a tension of 50 tons (490 kN) is introduced using a PC steel strand wire of φ26 mm as a tensional material.

In this conventional example, as illustrated in FIGS. 1(A) to 1(C), three prestressed concrete members are simultaneously manufactured in a longitudinal direction on a pretension bed (manufacturing apparatus 1) in a long line system.

As illustrated in FIG. 1(A), the PC steel strand wire is stretched between reaction force bases, and is tensed by a jack on a left side with a tensile load of 50 tons (490 kN) to add a prestress force.

Subsequently, as illustrated in FIG. 1(B), a lattice reinforcement (reinforcement) and a form are assembled while the PC steel strand wire is tensed, and a concrete is poured and cured.

When predetermined concrete strength is obtained, as illustrated in FIG. 1(C), the tension jack is gradually released, the PC steel strand wire is cut, and the tension is transferred to the prestressed concrete member.

A conventional prestressed concrete is manufactured in this way.

A prestressed concrete for structural materials is manufactured in this conventional example.

The present invention provides a prestressed concrete for non-primary structural members which can be used for general buildings.

A method for introducing a mechanical prestress can be similar to the conventional example (FIGS. 1(A) to 1(C)).

The prestressed concrete according to the present invention is achieved by a novel composition of a concrete, a tensional material, and a tensile load.

Formulation of a concrete is indicated below. (unit kg/m3)
cement: 543
admixture: fly ash: 63
admixture: expansive material: 20
water: 175
fine aggregate: 783
coarse aggregate: 810
admixture: water reducing agent: 7.50
water-binder ratio: 28%

A mixing ratio of an expansive agent is 20 kg/m3 as described above.

As a tensional material, a strand wire of a carbon fiber reinforced polymer (CFRP) material having a diameter of 12.5 mm was used.

A prestressed concrete having a size of 3 m×2.4 m×36 mm was used as one body, and five wires of the tensional materials were disposed at an interval of 500 mm in a lateral direction.

FIG. 2 illustrates an arrangement view of a tensional material.

A thickness T of a prestressed concrete 1 was 36 mm, and a tensional material 2 of φ12.5 mm was disposed in a central portion of the plate thickness.

A lattice reinforcement 3 was disposed on an upper surface of the tensional material. A covering thickness was about 7 mm.

In the above concrete composition, the tensional material was disposed, and a tensile load of 18 kN was introduced into each wire of the tensional material.

After curing was performed about for 24 hours, tension was released.

After a prestressed concrete was manufactured, compressive strength was 60 MPa or more, satisfying reference strength.

The prestressed concrete of the present invention has a plate thickness of 36 mm. A conventional prestressed concrete using a steel tensional material (φ12.5 mm) needs to have a covering thickness of about 30 mm considering a problem such as rust, and therefore needs to have a larger plate thickness than the prestressed concrete of the present invention by a difference in covering thickness (30 mm−7 mm), that is, about 23 mm on one side.

The prestressed concrete according to the present invention had a weight of 648 kg.

A conventional prestressed concrete using a steel tensional material has a plate thickness of 82 mm considering a covering thickness. When calculation was performed using an approximate weight of a general reinforced concrete (calculated using 2.5 tons per 1 m3), about 1476 kg was obtained, indicating reduction of 50% or more in weight.

As for cracking, cracking occurred when one person was placed on a central portion of the prestressed concrete plate according to the present invention and jumped about 30 cm to apply a shock with a body weight of 70 kg while fulcrums were put on lower parts of four corners of the prestressed concrete plate and the prestressed concrete plate was placed horizontally. However, when the load was removed, the cracks were completely closed by a crimping effect due to a prestress, and water leakage was not observed at all when a water leakage test was performed.

[Examples of Bending Test]

Test for Comparison Between Mechanical Stress and Chemical Stress Using Bending Test Six test bodies 10 were subjected to a bending test according to JISA1414 while conditions of a mechanical stress induced by a continuous fiber reinforcing wire (hereinafter, abbreviated as MS) and a chemical stress induced by an expansive material for a concrete (hereinafter, abbreviated as CS) were changed.

A composition of the concrete was similar to the above case in FIG. 2.

Each of the test bodies 10 had a size of length (L) 2 m×width (W) 1 m×thickness (t) 38 mm. As illustrated in FIG. 3(1), each of the test bodies 10 was a concrete thin plate, and three carbon fiber wires (CFRP) of φ7.5 mm were embedded therein. The carbon fiber wires (CFRP) are indicated by a broken line, and spine reinforcement (SR) is indicated by a dashed line. As illustrated in FIG. 3(2), three test bodies had no hole. As illustrated in FIG. 3(3), the other three test bodies had two through holes (large) 4: φ150 mm and two through holes (small) 5: φ75 mm around the center.

Stress conditions of the six test bodies are as follows.

(CASE-1) with MS+with CS: having no hole
(CASE-2) with MS+without CS: having no hole
(CASE-3) without MS+with CS: having no hole
(CASE-4) with MS+with CS: having a hole
(CASE-5) with MS+without CS: having a hole
(CASE-6) without MS+with CS: having a hole with MS: with a mechanical stress load induced by a continuous fiber reinforcing wire without MS: without a mechanical stress load induced by a continuous fiber reinforcing wire with CS: with an expansive agent
without CS: without an expansive agent
mechanical stress (MS) condition: continuous fiber reinforcing wire: carbon fiber wire: φ7.5 mm Three continuous fiber reinforcing wires were used in a longitudinal direction (interval of 250 mm) (refer to FIGS. 3(1) to 3(3)) .

tensile load: 20 kN per continuous fiber reinforcing wire
chemical stress (CS) condition: mixing ratio of an expansive agent: 20 kg/m3 bending test condition: performed with a two point-concentrated load using a bending test apparatus illustrated in FIG. 4.

Deflection was measured using a displacement meter 11.
span (distance between fulcrums: SL): 1,000 mm (refer to FIG. 5)

distance between internal load points (points to which a force is applied) (PL): 500 mm (refer to FIG. 5)

[Test Result]

FIGS. 6 and 7 are diagrams illustrating a relationship between a load and deflection.

FIG. 6 illustrates results of CASE-1 to CASE-3.

FIG. 6 illustrates a comparison result among three types each having no hole, (CASE-1) with MS+with CS,
(CASE-2) with MS+without CS, and
(CASE-3) without MS+without CS.

FIG. 7 illustrates results of CASE-4 to CASE-6.

FIG. 7 illustrates a comparison result among three types each having a hole, (CASE-4) with MS+with CS,
(CASE-5) with MS+without CS, and
(CASE-6) without MS+without CS.

FIGS. 8-1 to 8-6 are photographs comparing situations at the time of cracking and at the time of unloading in bending tests of CASE-1 to CASE-6.

In CASE3 (FIG. 8-3) and CASE6 (FIG. 8-6) into which only a chemical stress had been introduced, cracks remained even at the time of unloading after fracture.

On the other hand, in CASE1 (FIG. 8-1), CASE2 (FIG. 8-2), CASE4 (FIG. 8-4), and CASE5 (FIG. 8-5) into which a mechanical stress had been introduced, cracks returned to an original state and were not confirmed at the time of unloading after fracture.

The results of the bending test indicate the following.

| | fracture load | residual deflection | cracking situation after fracture (unloading) |
|---|---|---|---|
| CASE-1 | 20.3 | 0.63 | 0.05 mm or less |
| CASE-2 | 19.0 | 1.05 | 0.07 mm |
| CASE-3 | 14.2 | 2.73 | 0.40 mm or more |
| CASE-4 | 14.2 | 0.82 | 0.05 mm or less |
| CASE-5 | 12.6 | 1.36 | 0.05 mm or less |
| CASE-6 | 11.8 | 2.30 | 0.40 mm or more |

Three days after the bending test, a water leakage test of a cracked part was performed. A problem of water leakage was not observed in any cracked part.

This indicates that even when cracking occurs in a carbon fiber material having a tensional material embedded, cracks are removed by a restoring action at the time of unloading and a risk of water leakage disappears. Particularly when a mechanical stress was introduced into the tensional material, residual deflection was hardly observed, and a concrete was restored to such an extent that no crack could be confirmed.

The above test results indicate that the cases into which both a mechanical stress and a chemical stress have been introduced (CASE-1, CASE-4) have the highest fracture load and have the highest strength. In these cases, at the time of unloading after fracture, a crack is crimped by the mechanical stress and could be hardly confirmed, and there was no problem in a water leakage test at all.

In the cases only with a mechanical stress (CASE-2, CASE-4), a fracture load was higher than a case only with a chemical stress, and was lower than a case with a composite stress of the mechanical stress and the chemical stress. At the time of unloading after fracture, a crack is crimped by the mechanical stress and could be hardly confirmed, and there was no problem in a water leakage test at all.

The cases only with a chemical stress (CASE-3, CASE-6) indicate a low fracture load and the lowest strength. In these cases, a crack remained as it was although having a slightly smaller size after fracture, but water leakage was not confirmed in a water leakage test.

By the above results, it has been found that a case into which a composite stress of a mechanical stress and a chemical stress has been introduced has higher strength than a case into which a mechanical stress or a chemical stress is introduced singly.

It is considered that this is because a compression action by a mechanical stress and an expansion action by a chemical stress act synergistically to a concrete to enhance strength.

Results of the test bodies each having no hole (CASE-1 to CASE-3) and test bodies each having a hole (CASE-4 to CASE-6) indicate that in test bodies each having no hole (FIG. 6), CASE-1 (MS+CS) and CASE-2 (MS) have a high fracture load to approximately the same extent and CASE-3 (CS) has a slightly lower fracture load by comparison between the two graphs (FIGS. 6 and 7).

On the other hand, in the test bodies each having a hole (FIG. 7), CASE-4 (MS+CS) has a higher fracture load, and CASE-5 (MS) and CASE-6 (CS) have a low fracture load to approximately the same extent.

This is a particularly remarkable result. A case of no hole in FIG. 6 exhibits a large effect of a mechanical stress. CASE-1 (MS+CS) and CASE-2 (MS) into which a mechanical stress has been introduced have high strength. CASE-3 (CS) into which a mechanical stress has not been introduced has low strength. However, in a case where there is partially a large change in shape such as a cutout portion or an opening, like a hole illustrated in FIG. 7, it is indicated that not only a mechanical stress but also a chemical stress has a large effect on strength.

Conventionally, a high mechanical stress of 150 kN or more has been introduced into a prestressed concrete as a primary structural member requiring high strength. Unlike the present invention, a case of introducing a low mechanical stress has not been studied at all, and such a test has not been performed at all. In addition, combined use of a chemical stress for increasing strength has not been considered at all. It has been judged that there is no effect by the combined use.

As a conventional common sense, it has been believed that a case of introducing a mechanical stress hardly exhibits an effect even by combined use of a chemical stress. However, by this test, it has been confirmed that a low mechanical stress state of 150 kN or less at a plate thickness of 50 mm or less is effective for increasing strength by combined use of a chemical stress.

In particular, it has been confirmed that combination of a mechanical stress and a chemical stress is very effective when a prestressed concrete is used as a plate material for non-primary structures, partially having an opening, a cutout portion, or a hole, or having a high design property characterized by an irregular shape on a surface.

As described above, the prestressed concrete of the present invention has a significant effect of reduction in thickness, reduction in weight, and suppression of cracking, can be applied to an outer wall, a partition wall, a floorboard, a furniture material, or the like as a general building member (except for a primary structural member), and is an excellent concrete plate having a completely new design property due to a lightweight thin plate and having a potential of a design property.

REFERENCE SIGNS LIST 1 prestressed concrete
2 tensional material
3 lattice reinforcement
4 hole (large)
5 hole (small)
10 test body
11 displacement meter
12 crack
T plate thickness of concrete
L length of test body
W width of test body
t thickness of test body
CFRP carbon fiber wire
SR spine reinforcement
SL span (distance between fulcrums)
PL distance between internal load points (points to which a force is applied)

The invention claimed is:

1. A prestressed concrete for non-primary structural members, obtained by introducing a prestress into a concrete for non-primary structural members, wherein a mechanical stress induced by a tensional material and a chemical stress induced by an expansive material for a concrete are introduced simultaneously into the concrete, and the tensional material is a rust-resistant wire,
   the expansive material for a concrete is a mixture of one or more kinds selected from a lime-based expansive material, an ettringite-lime composite-based expansive material, an iron powder-based expansive material, a shale-based expansive material, and a silica-based expansive material,
   the rust-resistant wire of the tensional material has a wire diameter of 15 mm or less and a tensile load of 150 kN or less, and
   the concrete has a thickness of 50 mm or less.

2. The prestressed concrete for non-primary structural members according to claim 1, wherein the tensional material is a continuous fiber reinforcing wire.

3. The prestressed concrete for non-primary structural according to claim 2, wherein the continuous fiber reinforcing wire is a reinforcing fiber wire of one or more kinds of fibers selected from an aramid fiber, a carbon fiber, a glass fiber, and a poly-p-phenylenebenzobisoxazole fiber.

4. The prestressed concrete for non-primary structural members according to claim 1, wherein the tensional material is a wire formed of a shape memory alloy.

5. The prestressed concrete for non-primary structural members according to claim 1, wherein a mesh sheet formed of a fiber reinforced resin is used.

6. The prestressed concrete for non-primary structural members according to claim 1, wherein a porous artificial lightweight material is used.

7. The prestressed concrete for non-primary structural members according to claim 1, wherein a discontinuous reinforcing material is used.

8. The prestressed concrete for non-primary structural members according to claim 7, wherein the discontinuous reinforcing material is a reinforcing fiber material formed of one or more kinds of fibers selected from a carbon fiber, a glass fiber, a resin fiber, and a shape memory alloy material.

9. The prestressed concrete for non-primary structural members according to claim 1, wherein a pigment is mixed.

10. The prestressed concrete for non-primary structural members according to claim 1, wherein any irregularities are formed on a surface thereof using a soft form.

\* \* \* \* \*